MANUFACTURE OF AZODICARBONAMIDE

Henry A. Hill, Watertown, Mass., assignor to National Polychemicals, Inc., Wilmington, Mass., a corporation of Massachusetts
No Drawing. Filed Oct. 17, 1957, Ser. No. 690,634
10 Claims. (Cl. 260—192)

Azodicarbonamide has been proposed as a blowing agent in the manufacture of cellular products from rubber and plastics. It is known to release nitrogen upon melting or decomposing, but objections such as high decomposition temperature, poor dispersion, residual color and inefficient blowing have been raised. Yields of the product derived from a raw material so expensive as hydrazine have left much to be desired.

The most effective use of azodicarbonamide as a blowing agent to produce the lowest density possible from a given amount or to obtain a given density with a minimum amount of the agent has not been achieved. Particularly in cellular products derived from vulcanized rubber full usage of its blowing potential has not been achieved. Only partial decomposition of the blowing agent to release its nitrogen results and the undecomposed azodicarbonamide can be extracted from the rubber compound.

The principal objects of this invention are to overcome the afore-mentioned objections and to produce azodicarbonamide in a form which permits full utilization of its potential power to reduce the density of plastic and vulcanized rubber articles.

Further objects of this invention are to produce azodicarbonamide in essentially quantitative yields, to produce azodicarbonamide in a form which will decompose completely in vulcanized rubber articles thus removing an undesired interference with the color of the rubber articles produced, and to produce azodicarbonamide in the form of microcrystals, the major dimension of which is of the order of one micron.

I have found that when azodicarbonamide is prepared by oxidizing hydrazodicarbonamide under certain conditions, particularly the control of the temperature of the reaction mixture, the concentration of the oxidant and the ratio of oxidizing solution to the reductant, that I not only attain greatly superior yields, but also a means of controlling the particle size of the product to obtain a discrete microcrystalline structure of the order of one micron or less in its major dimension, as distinguished from the large aggregates which would otherwise be obtained. I have attained yields better than 98% of the theoretical, as compared with 84% for certain known procedures. Such as that set forth in B.I.O.S. Final Report No. 1150 at page 23. Quite contrary to expectations a more concentrated oxidant at lower temperature and a slightly longer reaction time gave both higher yields and a many-fold smaller particle.

As is known urea reactions with hydrazine or its salts to form hydrazodicarbonamide according to the following equation:

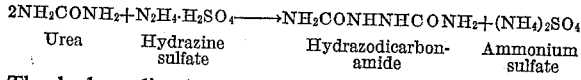

| Urea | Hydrazine sulfate | Hydrazodicarbonamide | Ammonium sulfate |

The hydrazodicarbonamide reacts with oxidizing agents such as chromic acid or chlorine to form azodicarbonamide according to the following equation:

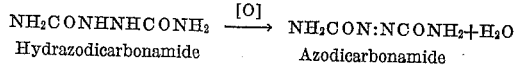

Hydrazodicarbonamide        Azodicarbonamide

In accordance with the present invention one part, by weight of hydrazodicarbonamide is suspended in two to four parts, by weight of water to form an aqueous slurry.

The hydrazodicarbonamide may, if desired, be prepared in accordance with known procedures, but I prefer to synthesize it from hydrazine hydrate, monohydrazine sulfate or dihydrazine sulfate, urea and sulfuric acid, as hereinafter set forth.

After having formed the aqueous slurry, an alkali metal chromate is added, such as potassium or sodium chromate, dichromate or polychromate, but irrespective of the particular chromate used the amount should be sufficient to effect oxidation of the hydrazodicarbonamide to azodicarbonamide. The oxidation takes place upon the addition of sulfuric acid in an amount sufficient to liberate $CrO_3$ (chromic acid) from the chromate. Variations such as the use of chromium trioxide in the presence of a non-oxidizing mineral acid or the addition of the required amount of sulfuric acid followed by addition of a solid alkali metal chromate or dichromate salt or chromium trioxide are within the scope of the invention.

When an alkali metal chromate or dichromate or a concentrated solution thereof is added first, the subsequent addition of the acid should be slow, preferably extending over a period of one to two hours, and under no conditions should the rate of addition be such as to increase the temperature above approximately 85° F. Accordingly, the reaction mixture may be and preferably is refrigerated to maintain a temperature between 32° and 85° F. Lower temperatures approaching the solidification temperature of the mass are operable but are less practicable. In any case, this temperature range is held until all the reactants are added to the reaction vessel. The temperature and conversion time are inversely related and although substantially complete conversion may be achieved while maintaining the above temperature range, it is at the expense of efficient use of the production facilities. For example, by maintaining a temperature of approximately 32° F., several days will be required to achieve substantially complete conversion.

I have found that a family of forms of azodicarbonamide may be produced within the concentration and temperature limits hereinafter set forth. For example, I may hold the temperature at 32° F. throughout the reaction. I may run from 5 to 30% conversion at 32° F. then heat the reaction mixture to a maximum of about 150° F. to achieve complete conversion. I may run to about 30% conversion at 50, 65 or 80° F., then heat the reaction mixture to a maximum of about 150° F. to achieve complete conversion. I may run to any desired percentage conversion, i.e., to 50, 60 or even 80% at a temperature below 85° F., then heat the reaction mixture to a maximum of about 150° F. to achieve complete conversion.

If a time of two hours is selected for addition of dilute sulfuric acid, the percent converted at this time will vary from about 5% at 32° F. to 25% at 75° F. If the temperature of the reaction mixture has been maintained at approximately 85° F. for two hours while adding dilute sulfuric acid and for two hours more and a conversion of 70 to 75% achieved, thereafter heating the reaction mixture at such a rate as to reach a temperature of approximately 150° F. in a period of one and one-half hours will result in substantially complete conversion.

In all these variations azodicarbonamide is produced in a form definitely superior to the product of the prior art and capable of being used more effectively as a blowing agent in rubber and plastics.

After having completed the reaction the insoluble azodicarbonamide may be recovered by filtration, washed and dried in conventional manner. Certain additions such as mineral oils or ester type plasticizers, diluents, etc. may be made before or after filtration in accordance with recognized practices of the art.

So long as the aforementioned conditions of time, temperature and concentration are observed, the resulting yield of azodicarbonamide will be approximately 98% of the theoretical and the product is characterized by being a very light yellow color and in the form of discrete microcrystalline particles, the major dimension of which is of the order of about one micron which need not be ground or otherwise treated, as contrasted with the orange or orange-red crystalline aggregates which must be ground even to pass a 325-mesh sieve (44 microns).

Examples illustrating the foregoing are as follows:

Example 1

A suitably jacketed 1,000-gallon enameled steel kettle equipped with a stirrer and reflux condenser was charged with 1,200 pounds of dihydrazine sulfate (containing 14.1 moles of hydrazine), 3,000 pounds of water and 3,500 pounds of urea (58.4 moles). Heating was started and 712 pounds of sulfuric acid was added, advantage being taken of the heat of dilution to accelerate the approach to the reflux temperature of approximately 220° to 230° F. While the mixture was held at the reflux temperature, sulfuric acid was added until an iodide-titration test on the filtrate from a cooled sample of the mixture indicated that all hydrazine had been converted to hydrazodicarbonamide in essentially quantitative yield. Approximately 1425 pounds of sulfuric acid (13.50 moles) were required. The resulting hydrazodicarbonamide was in the form of an aqueous slurry and did not have to be isolated for the practice of this invention.

The slurry was then cooled to about 70° F. after which 1,600 pounds of sodium dichromate dihydrate were added. Thereafter, 4,000 pounds of 55% sulfuric acid were run in over a period of two hours while maintaining the reaction mixture at essentially 70° F. by running cold water or brine through the jacket. At this point 20–30% azodicarbonamide conversion had been achieved. The conversion is conveniently determined by a solubility relationship, i.e., hydrazodicarbonamide is quantitatively insoluble while azodicarbonamide is moderately soluble in dimethylsulfoxide. The temperature was held at essentially 70° F. for about two hours more at which time a conversion of about 50% had been achieved, as indicated by the dimethylsulfoxide test, and then the reaction mass was heated at such a rate that a temperature of 150° F. was attained in one and one-half hours, at the end of which 100% conversion had taken place, giving a 98% yield of azodicarbonamide.

Example 2

A slurry containing 100 parts of hydrazodicarbonamide was prepared in the manner set forth in Example 1 and was cooled to about 32° F. After adding 100 parts of sodium dichromate dihydrate, 250 parts of 55% sulfuric acid were added over a two hour period, while the reaction mixture was maintained at a temperature between 32 and 35° F. The mixture was heated to 150° F. in 1.6 hours at which time conversion was complete.

Example 3

Following B.I.O.S. Final Report No. 1150 at page 23, 90 parts of hydrazodicarbonamide was added to 660 parts of 20% sulfuric acid and the mixture oxidized by addition of 89 parts of sodium dichromate (solid) during one hour at 122° F. The mixture was then stirred at 140° F. for one hour after which the product was filtered off and washed with water until neutral. Yield was 77 parts equivalent to 84% of the theoretical.

Example 4

A slurry of hydrazodicarbonamide was prepared in the manner set forth in Example 1. The slurry was cooled to about 95° F., then 1,600 pounds of sodium dichromate dihydrate were added, then 4,000 pounds of 55% sulfuric acid were added over a period of one and one-half hours, while the temperature was held between 97 and 102° F. by external cooling. The mixture was held between 97 and 102° F. for two hours additional then heated to 140° F. over a period of two hours. The azodicarbonamide was isolated in the usual manner and was found to be in the form of crystal aggregates with an orange red color.

Example 5

A rubber compound designed for a low-gravity shoe soling stock was used to illustrate the properties of my blowing agent. A masterbatch was made from the following:

| Ingredients | Parts |
| --- | --- |
| Styrene-Butadiene Rubber 1010 a | 85.0 |
| Styrene-Butadiene Rubber 1006 b | 15.0 |
| Styrene-Butadiene Resin c | 15.0 |
| Cumarone-Indene Resin (soft pt. 220° F.) | 10.0 | were mixed on a rubber mill at 220–250° F., the mill was cooled to 160–180° F. and then there were added—

| | |
| --- | --- |
| Stearic Acid | 4.0 |
| Octylated Diphenylamine | 1.0 |
| Hydrated Silica | 30.0 |
| Soft clay | 70.0 |
| Ground whiting | 25.0 |
| Titanium Dioxide | 15.0 |
| Zinc Oxide | 5.6 |
| Light process oil | 15.0 |
| Diethylene Glycol | variable |

Portions of the masterbatch in the proportions given above were mixed on a rubber mill at 120–30° F. with—

| | |
| --- | --- |
| Blowing Agent | variable |
| Dibenzothiazyldisulfide | 1.8 |
| Diorthotolylguanidine | 0.3 |
| Sulfur | 3.0 | a Styrene 23.5 parts, butadiene 76.5 parts polymerized at 122° F. Mooney viscosity (ML4 at 212° F.) 30.
b Styrene 23.5 parts, butadiene 76.5 parts polymerized at 122° F.; contains a non-staining antioxidant, Mooney viscosity (ML4 at 212° F.) 50.
c A copolymer resin, styrene 85 parts, butadiene 15 parts.

A series of tests to show the effectiveness of azodicarbonamide made according to this invention was run on the masterbatch which has a specific gravity of 1.34 before vulcanization.

| | A | B | C | D | E | F |
| --- | --- | --- | --- | --- | --- | --- |
| Azodicarbonamide | Ex. 1 | Ex. 3 | Ex. 1 | Ex. 3 | Ex. 1 | Ex. 3 |
| Parts per 100 parts Rubber Hydrocarbon | 12.5 | 12.5 | 10.0 | 10.0 | 8.0 | 8.0 |
| 1st cure: Min. at 315° F | 11 | 13 | 12 | 13 | 13 | 13 |
| 2nd cure: Min. at 307° F | 15 | 15 | 15 | 15 | 15 | 15 |
| Specific Gravity, 70° F./70° F | 0.12 | 0.32 | 0.18 | 0.37 | 0.27 | 0.39 |
| Percent Expansion | 1,015 | 319 | 645 | 262 | 396 | 244 |
| Percent Expansion per part blowing agent | 81.2 | 25.4 | 64.5 | 26.2 | 49.5 | 30.7 | a Percent expansion = $\frac{\text{Final volume} - \text{Initial volume}}{\text{Initial volume}} \times 100$.

Tests A to F contained 1.0 part diethyleneglycol per 100 parts of rubber hydrocarbon.

It is seen that azodicarbonamide prepared according to this invention gives greater than a three-fold reduction in density than the previously known product and that eight (8) parts of azodicarbonamide prepared according to this invention produces a lower specific gravity than 12.5 parts of the previously known product.

Example 6

A series of tests was made, using the master batch prepared in Example 5, to show the effectiveness of azodicarbonamide prepared according to this invention with and without an activator such as diethyleneglycol.

|  | G | H | J | K | L | M |
|---|---|---|---|---|---|---|
| Azodicarbonamide | Ex. 1 | Ex. 3 | Ex. 1 | Ex. 3 | Ex. 1 | Ex. 3 |
| Parts per 100 parts Rubber Hydrocarbon | 9.0 | 9.0 | 8.0 | 12.0 | 8.0 | 12.0 |
| Diethylene Glycol | | | | | 1.0 | 1.0 |
| Hardness (Shore A) | −20 | 25 | 32 | 27 | 38 | 38 |
| Specific Gravity, 70° F./70° F. | 0.19 | 0.34 | 0.24 | 0.28 | 0.31 | 0.31 |
| Percent Expansion | 606 | 295 | 459 | 379 | 332 | 329 |
| Percent Expansion per part of blowing agent | 67.4 | 32.8 | 57.4 | 31.6 | 41.5 | 27.4 |

Tests G to M cured 13 minutes at 315° F.; 15 minutes at 307° F.

Tests G and H show that at equal weights azodicarbonamide prepared according to this invention gives 300% greater expansion than the product of the prior art. Tests J and K show that eight (8) parts of azodicarbonamide prepared according to this invention gives 80% greater expansion than twelve (12) parts of the product of the prior art, although the state of cure is higher in the former compound. Tests L and M show that eight (8) parts of azodicarbonamide prepared according to this invention gives an expansion equal to the expansion given by twelve (12) parts of the product of the prior art at the same state of cure.

Example 7

A rubber compound designed for a medium gravity shoe soling stock was used for further illustration of the properties of azodicarbonamide made according to this invention. A master batch was made from the following:

| Ingredient | Parts |
|---|---|
| Styrene-Butadiene Rubber 1502 [a] | 65.0 |
| Styrene-Butadiene Rubber 1703 [b] | 44.0 |
| Styrene-Butadiene Resin [c] | 45.0 |
| Pentachlorothiophenol | 1.0 | were mixed on a rubber mill for 7.5 minutes at 270° F. The mill was cooled to 220° F. and then was added—

| | |
|---|---|
| Cumarone-Indene Resin (soft pt. 220° F.) | 7.5 |

The temperature was held at 180–190° F. and then were added in ten minutes to complete the masterbatch—

| | |
|---|---|
| Octylated Diphenylamine | 1.0 |
| Stearic Acid | 3.0 |
| Hard Clay | 50.0 |
| Hydrated Silica | 30.0 |
| Light Process Oil | 10.0 |
| Zinc Oxide | 5.0 |
| Titanium Dioxide | 10.0 |

The mill was cooled to 120–130° F. and then were added to portions of the masterbatch—

| | |
|---|---|
| Diethylene Glycol | variable |
| Dibenzothiazyldisulfide | 1.8 |
| Diorthotolylguanidine | 0.3 |
| Azodicarbonamide | 4.0 |
| Sulfur | 3.5 |

The compounds were cured thirteen (13) minutes at 315° F. and fifteen (15) minutes at 307° F.

[a] Styrene 23.5, butadiene 76.5 polymerized at 43° F. to a Mooney viscosity (ML4 at 212° F.) of 50.
[b] Styrene 23.5, butadiene 76.5 polymerized at 43° F. to a Mooney Viscosity (ML4 at 212° F.) of 60, and oil extended with 25 parts per 100 of naphthenic processing oil.
[c] Styrene 85 parts, butadiene 15 parts copolymer.

|  | N | O | P | Q |
|---|---|---|---|---|
| Azodicarbonamide | Example 1 | Example 4 | Example 1 | Example 4 |
| Diethylene Glycol | | | 1.25 | 1.25 |
| Hardness (Shore A) | 65 | 65 | 72 | 74 |
| Specific Gravity, 70° F./70° F. | 0.37 | 0.61 | 0.43 | 0.48 |
| Percent Expansion | 362 | 220 | 312 | 280 |
| Percent Expansion per part of blowing agent | 90.5 | 55 | 78 | 70 |
| Cell structure | very fine, uniform | coarse, irregular | very fine, uniform | coarse, irregular |

Tests N, O, P and Q show again the superior results from azodicarbonamide made according to this invention as regards percentage expansion and cell structure.

Example 8

A rubber compound designed for general usage was prepared for further illustration of the properties of azodicarbonamide made according to this invention. A masterbatch was made from the following:

| Ingredient | Parts |
|---|---|
| Styrene-Butadiene Rubber 1010 [a] | 100.0 |
| Cumarone-Indene Resin (soft pt. 220° F.) | 10.0 |
| Stearic Acid | 3.0 |
| Octylated Diphenylamine | 1.0 |
| Hard Clay | 35.0 |
| Ground Whiting | 65.0 |
| Light Process Oil | 15.0 |
| Zinc Oxide | 5.0 |

[a] Styrene 23.5 parts, butadiene 76.5 parts polymerized at 122° F.; Mooney viscosity (ML4 at 212° F.) 30.

Portions of the masterbatch in the proportions given above were mixed on a rubber mill at 120° F. to 130° F. with the following:

| | |
|---|---|
| Diethylene glycol | 1.0 |
| Dibenzothiazyldisulfide | 0.75 |
| Diorthotolylguanidine | 0.25 |
| Azodicarbonamide | variable |
| Sulfur | 3.0 |

|  | R | S | T | U |
|---|---|---|---|---|
| Azodicarbonamide | Example 1 | Example 3 | Example 1 | Example 3 |
| Parts per hundred Rubber Hydrocarbon | 7.5 | 7.5 | 4.0 | 4.0 |
| 1st cure: Min. at 315° F. | 12 | 12 | 13 | 13 |
| 2nd cure: Min. at 307° F. | 15 | 15 | 15 | 15 |
| Specific Gravity, 70° F./70° F. | 0.19 | 0.90 | 0.56 | 1.01 |
| Percent Expansion | 606 | 49 | 139 | 33 |
| Percent Expansion per part of blowing agent | 80.9 | 6.53 | 34.8 | 8.25 |

Example 9

A soling stock based on natural rubber was used further to illustrate the superior properties of azodicarbonamide made according to this invention. A masterbatch was made of the following:

| Ingredient | Parts |
|---|---|
| Pale Crepe | 80.0 |
| Styrene-Butadiene Rubber 1006 [a] | 20.0 |
| Styrene-Butadiene Resin [b] | 20.0 |
| Zinc Pentochlorothiophenolate | 0.3 | were mixed in a rubber mill five minutes at 230° F., then cooled to 212° F. and was added—

| | |
|---|---|
| Cumarone-Indene Resin (soft pt. 220° F.) | 5.0 | the mill was cooled to 150° F. and in 12–14 minutes were added—

| | |
|---|---|
| Soft Clay | 60.0 |
| Hydrated Sodium Silico Aluminate | 30.0 |
| Whiting | 20.0 |
| Titanium Dioxide | 15.0 |
| Zinc Oxide | 5.0 |
| Light Processing Oil | 10.0 |
| Stearic Acid | 2.0 |
| Octylated Diphenylamine | 2.0 |

The masterbatch had a Mooney viscosity (ML4 at 212) of 40.
[a] Styrene 23.5, butadiene 76.5 polymerized at 122° F. to a Mooney viscosity (ML4 at 212° F.) of 50.
[b] Styrene 85 parts, butadiene 15 parts copolymer.

To 269.3 parts of the masterbatch was added 10 parts azodicarbonamide and 0.4 parts tetramethylthiuramdisulfide and 3.5 parts sulfur. Cure was 12.5 minutes at 307° F. and five (5) hours at 212° F.

| Test | V | W |
|---|---|---|
| Azodicarbonamide | Example 1 | Example 3 |
| Specific Gravity, 70° F./70° F. | 0.25 | 0.84 |
| Hardness (Shore A) | 25 | 57 |
| Percent Expansion | 435 | 58 |
| Percent Expansion per part blowing agent | 43.5 | 5.8 |

*Example 10*

Portions of the masterbatch described under Example 5 were mixed with the accelerators and blowing agents and cured as indicated:

| Test | X | Y |
|---|---|---|
| Azodicarbonamide | Example 3 | Example 2 |
| Parts per 100 parts of Rubber Hydrocarbon | 10 | 5 |
| Sulfur | 3 | 3 |
| Dibenzothiazyldisulfide | 1.8 | 1.2 |
| Diorthotolylguanidine | 0.3 | 0.2 |
| Diethylene Glycol | 1.0 | 1.0 |
| 1st cure: Min. at 315° F | 13 | 13 |
| 2nd cure: Min. at 307° F | 15 | 15 |
| Hardness (Shore A) | 34 | 35 |
| Specific Gravity, 70° F./70° F. | 0.35 | 0.31 |
| Percent Expansion | 284 | 332 |
| Percent Expansion per part blowing agent | 28.4 | 66.4 |

At the same state of cure only half as much of an azodicarbonamide of this invention is required to produce a lower specific gravity than the previously known product.

I claim:

1. The process of producing azodicarbonamide, which comprises suspending approximately one part, by weight, of hydrazodicarbonamide in two to four parts, by weight, of water to form an aqueous slurry, adding to said slurry an alkali metal chromate in an amount at least sufficient to effect complete oxidation of the hydrazodicarbonamide, slowly adding dilute sulfuric acid to said slurry in an amount sufficient to liberate the $CrO_3$ from said chromate and to effect oxidation of the hydrazodicarbonamide to partially convert the hydrazodicarbonamide to azodicarbonamide while maintaining the reaction mixture at a temperature of approximately 85° F., thereafter heating the reaction mixture to a temperature between 110° and 150° F. until approximately complete conversion to azodicarbonamide has been achieved, and finally filtering, washing and drying the azodicarbonamide thus produced.

2. The process of producing azodicarbonamide, which comprises reacting urea, a hydrazine sulfate and sulfuric acid in water to form an aqueous slurry of hydrazodicarbonamide containing approximately one part by weight of hydrazodicarbonamide in two to four parts by weight of water, adding to said slurry an alkali metal chromate in an amount at least sufficient to effect complete oxidation of the hydrazodicarbonamide, slowly adding dilute sulfuric acid to said slurry in an amount sufficient to liberate the $CrO_3$ from said chromate and to effect oxidation of the hydrazodicarbonamide to partially convert the hydrazodicarbonamide to azodicarbonamide while maintaining the reaction mixture at a temperature not exceeding 85° F., thereafter heating the reaction mixture to a temperature not exceeding 150° F. until approximately complete conversion to azodicarbonamide has been achieved, and finally filtering, washing and drying the azodicarbonamide thus produced.

3. The process of producing azodicarbonamide, which comprises reacting urea, a hydrazine sulfate and sulfuric acid in water to form an aqueous slurry of hydrazodicarbonamide containing approximately one part by weight of hydrazodicarbonamide in two to four parts by weight of water, adding to said slurry an alkali metal chromate in an amount at least sufficient to effect oxidation of the hydrazodicarbonamide, slowly adding dilute sulfuric acid to said slurry in an amount sufficient to liberate the $CrO_3$ from said chromate and to effect oxidation of the hydrazodicarbonamide to partially convert the hydrazodicarbonamide to azodicarbonamide while maintaining the reaction mixture at a temperature between 32° and 85° F., thereafter heating the reaction mixture to a temperature between approximately 110° and 150° F. until approximately complete conversion to azodicarbonamide has been achieved, and finally filtering, washing and drying the azodicarbonamide thus produced.

4. The process of producing azodicarbonamide, which comprises suspending approximately one part by weight of hydrazodicarbonamide in two to four parts by weight of water to form an aqueous slurry, adding to said slurry an alkali metal chromate in an amount at least sufficient to effect complete oxidation of the hydrazodicarbonamide, slowly adding dilute sulfuric acid to said slurry in an amount sufficient to liberate the $CrO_3$ from said chromate and to effect oxidation of the hydrazodicarbonamide to partially convert the hydrazodicarbonamide to azodicarbonamide, while maintaining the reaction mixture at a temperature not exceeding about 85° F. until at least a partial conversion to azodicarbonamide has been achieved, and thereafter maintaining the reaction mixture at a temperature not exceeding approximately 150° F. until approximately complete conversion to azodicarbonamide has been achieved, and finally filtering, washing and drying the azodicarbonamide.

5. The process of producing azodicarbonamide which comprises suspending approximately one part by weight of hydrazodicarbonamide in two to four parts by weight of water to form an aqueous slurry, maintaining the temperature of the slurry at no higher than 85° F. while incorporating $CrO_3$ and a non-oxidizing mineral acid in the slurry at a rate such that the temperature does not exceed 85° F. and in amounts sufficient to effect complete oxidation of the hydrazodicarbonamide to convert hydrazodicarbonamide to azodicarbonamide, maintaining the reaction mixture at a temperature not exceeding 85° F. until at least partial conversion to azodicarbonamide has been achieved, thereafter maintaining the reaction mixture at a temperature not exceeding approximately 150° F. until approximately complete conversion to azodicarbonamide has been achieved and recovering the azodicarbonamide.

6. The process defined by claim 5 wherein after partial conversion to azodicarbonamide has been achieved the reaction mixture is heated to a temperature between 110–150° F.

7. The process defined by claim 5 wherein the aqueous slurry of hydrazodicarbonamide is formed by reacting urea, a hydrazine sulfate, and sulfuric acid in water.

8. The process defined by claim 5 wherein the reaction mixture is heated to a temperature not exceeding approximately 150° F. in a period of less than one and one half hours.

9. The process defined by claim 5 wherein between about 5 and 80 percent conversion to azodicarbonamide is achieved while maintaining the reaction mixture at a temperature not exceeding about 85° F.

10. Azodicarbonamide formed by the process defined by claim 5.

References Cited in the file of this patent

Thiele: Annalen, vol. 271, page 129, 1892.

B.I.O.S. Final Report No. 1150, page 23. (Library of Congress Copy dated June 6, 1947).